Feb. 27, 1951 H. G. SCHWARZ 2,543,305

CIRCUIT FOR SUPPRESSING UNDESIRED OSCILLATIONS
IN TELEVISION RECEIVERS

Filed Dec. 16, 1949

INVENTOR.
HANS G. SCHWARZ
BY Alden D. Redfield
Charles M. Hogan
ATTORNEYS.

Patented Feb. 27, 1951

2,543,305

UNITED STATES PATENT OFFICE 2,543,305

CIRCUIT FOR SUPPRESSING UNDESIRED OSCILLATIONS IN TELEVISION RECEIVERS

Hans G. Schwarz, Cincinnati, Ohio, assignor to Avco Manufacturing Corporation, Cincinnati, Ohio, a corporation of Delaware Application December 16, 1949, Serial No. 133,355

4 Claims. (Cl. 315—27)

Figures 1, 2, 3, 4:
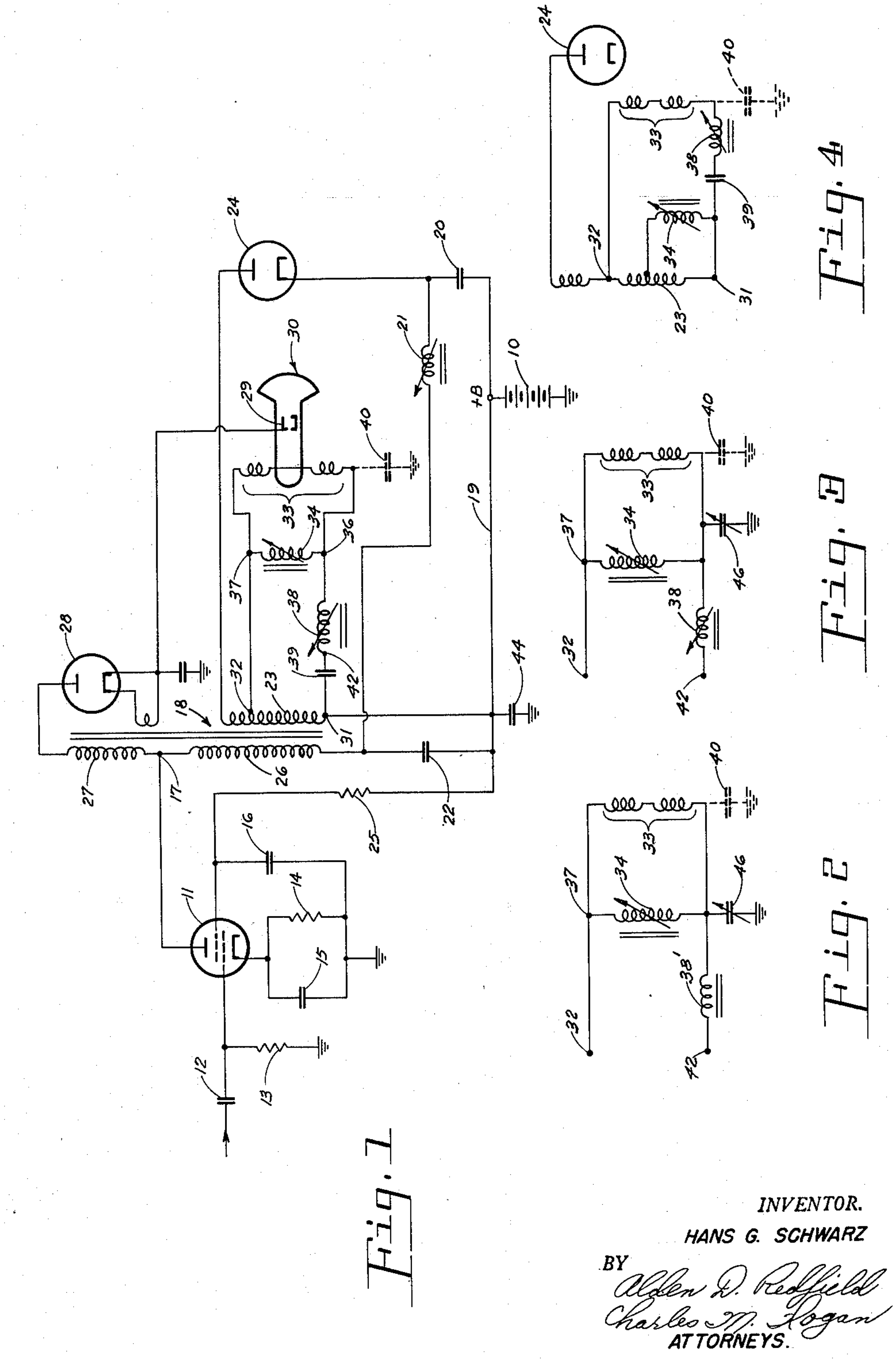

The present invention relates to an oscillation-suppression circuit and is of particular utility as embodied in the horizontal deflecting system of a television receiver.

The primary object of the invention is to provide a circuit for preventing, or at least minimizing, the undesirable effects of the high frequency transient oscillations (so-called "ring") during the scanning period.

Another basic object is to provide a circuit which utilizes existing components to the fullest extent in accomplishing such suppression.

For a better understanding of the present invention, together with other objects, advantages and capabilities thereof, reference is made to the following description of the accompanying drawings, in which there are shown, in schematic form, several illustrative embodiments of the invention as incorporated in a horizontal deflection circuit:

Fig. 1 illustrating a preferred form in which the rejector circuit inductor is variable and the width-controlling inductor is across the whole deflection-transformer secondary;

Fig. 2 illustrating a modified form in which the inductor is fixed and the distributed capacitance is in parallel with a trimmer capacitor;

Fig. 3 illustrating another modified form in which both inductor and trimmer are variable; and Fig. 4 illustrating a fourth form of the invention wherein the width-control coil is in shunt with only a portion of the deflection-transformer secondary.

In the drawings, the numeral 11 designates a conventional power amplifier tube for the horizontal deflecting system, associated with an input coupling capacitor 12 and a grid resistor 13, a cathode resistor 14, by-passed by a capacitor 15, and a screen by-pass capacitor 16. The anode of this tube is connected to one terminal 17 of the primary of a deflection transformer 18. The positive terminal (+B) of the plate supply battery 10 is connected to conductor 19, and the anode circuit of tube 11 is completed through booster capacitor 20 and inductor 21, both of the latter being included in a linearity control network comprising inductor 21 and capacitor 22. This linearity control network is described in U. S. Patent 2,440,418 to S. I. Tourshou, issued April 27, 1948, entitled "Cathode Ray Beam Deflecting Circuit," and assigned to Radio Corporation of America, to which reference is made for a detailed description thereof.

Across the secondary 23 of transformer 18 is connected a series combination of a damper diode tube 24 and booster capacitor 20, the purposes and operation of which are described in detail in the aforementioned Tourshou patent.

It will be understood that tube 11 and the circuits (not shown) preceding it and with which it is in cascade, constitute a source of deflecting signals, the details of which are well known to those familiar with this art and need not be illustrated herein.

Screen voltage is supplied to power tube 11 from conductor 19, through a filter network comprising a series screen dropping resistor 25 and shunt capacitor 16.

A high voltage auxiliary winding 27, in series with primary 26, applies a high positive voltage to the anode of a diode rectifier 28, during retrace, to provide voltage for the accelerating anode 29 of the cathode-ray picture tube 30, as described in the following U. S. patents: No. 2,458,532, K. Schlesinger, issued January 11, 1949, entitled "Cathode-Ray Tube Circuit"; No. 2,051,372, Philo T. Farnsworth, issued August 18, 1936, entitled "Scanning and Synchronizing System"; No. 2,428,948, C. E. Torsch, et al., issued October 14, 1947, entitled "High Voltage Transformer"; and No. 2,443,030, R. F. Foster, issued June 8, 1948, entitled "Picture Size Control Circuit for Television Receivers."

A portion of secondary 23, i. e., the portion between terminal 31 and tap 32, is coupled to the horizontal deflecting coils 33 of a conventional deflection yoke. The coils 33 may, for example, form part of the deflecting yoke which embraces the neck of a cathode ray picture tube. Such a deflecting yoke, per se, is well known, and it may be of the type shown in Tolson Patent No. 2,155,514, assigned to the Radio Corporation of America. The cathode ray tube itself is of any conventional design and is consequently schematically indicated by the numeral 30. Connected in parallel with the yoke is a width control inductor 34. A typical width control inductor is disclosed in U. S. Patent 2,449,969 to A. Wright, issued September 28, 1948, assigned to Radio Corporation of America.

A blocking capacitor 39 is connected between terminal 31 and the junction 36 of inductor 34 and windings 33.

Neglecting for the moment, and for purposes of discussion only, the presence of inductor 38, the circuit shown in Fig. 1 represents a conventional deflection circuit. In the normal operation of this circuit the sudden cut-off of power tube 11 at the end of the trace period initiates the transient oscillation required for the fly-back of the beam from the right side of the raster to the left, the frequency of this transient oscillation being determined by the inductance of the deflection yoke 33 and the distributed capacities of various parts of the circuit as reflected in shunt to that yoke.

It is well known in the art that this sudden periodic cut-off of the power tube 11 causes additional transient oscillations of a higher frequency. These oscillations are undesired and are designated in the art by the name "ring." They are of a considerably higher frequency than the first-mentioned transient oscillations and are generally in the range between 150 kilocycles and 400 kilocycles per second. The "ring" frequency is determined by the leakage inductance of the transformer 18 and the stray capacities of the associated circuit components. The undesired transient oscillations introduce currents into the deflecting circuit which cause the electrons to sweep across the fluorescent screen at a non-uniform speed. The presence of these undesired transient currents is frequently manifested by the appearance of vertical bars on the image raster. The invention is directed to the suppression of these undesired transient oscillations.

Numerous unsuccessful attempts have been made to eliminate "ring" of this nature without increasing the power requirements of the deflection output circuit. Such attempts have generally consisted of the provision of a trap circuit comprising a parallel combination of an inductor and a capacitor between the high potential terminals of the transformer and the yoke. Such expedients have been found to be completely inoperative. In fact, it has been found that the disposition of an inductor in series between tap 32 of transformer 18 and the high potential junction 37 of width control inductor 34 and deflection windings 33, in accordance with the prior art, aggravates the undesired oscillations.

In accordance with the invention, I provide an improvement for suppressing these undesired oscillations. This improvement comprises an inductor 38 which is connected in series with secondary 23 and yoke windings 33, this inductor being placed in circuit on the low potential side of the secondary 23 and windings 33, together with means for tuning the parallel circuit formed by inductor 38 and the distributed capacitance 40 between the windings 33 and ground. This distributed capacitance 40 is effectively between the windings 33 and terminal 42, because terminal 42 is substantially at ground potential for radio frequencies. This means tunes the circuit 38—40 to anti-resonance for frequencies of the order of the undesired oscillations— i. e., 150 kilocycles to 400 kilocycles per second. I have found that the undesired oscillations are thereby suppressed, and this result has been produced while usefully employing the distributed capacitance 40. The specific tuning means indicated in Fig. 1 involves the variation of the value of inductor 38, preferably by an adjustment of the position of a core element (not shown, but indicated by a parallel-line legend) which is formed of either magnetic or comminuted magnetic material.

Terminal 42 of inductor 38 is at ground potential for "ring" frequencies because it is connected to ground through two large capacitors, the first being capacitor 39 and the second being indicated by the reference numeral 44, this numeral being collectively indicative of the shunt capacitance included in the filters (not shown) which steady the +B potential available at conductor 19.

Distributed capacitance 40 and inductor 38 form a parallel anti-resonant combination or rejector circuit in series with yoke 33 and eliminate the undesired "ring" frequency signals. This is accomplished by utilizing the available distributed capacitance 40 and by simply placing a variable inductor, such as 38, on the low-potential side of the deflection-transformer output circuit.

Referring now specifically to the embodiment illustrated in Fig. 2, it will be understood that the inductor 38′ may be fixed, and that tuning of the rejector circuit may be accomplished by a trimmer capacitor 46, connected between the low-potential lead of deflection coils 33 and ground. In Fig. 2 only the rejector circuit, the width control inductor, and the deflection coils are shown, it being readily apparent that those elements may be placed in the general environment illustrated in Fig. 1. Like reference numerals are used throughout the drawings to illustrate common elements.

The Fig. 3 embodiment comprises a variable inductor 38 and a trimmer capacitor 46, both elements of the trap circuit being adjustable.

The Fig. 4 embodiment is substantially the same as the Fig. 1 embodiment, except that the width control inductor 34 is connected in parallel with only a part of the deflection transformer secondary 23, and further that the elements 38 and 39 are in circuit between width control inductor 34 and coils 33 rather than between width control inductor 34 and secondary 23, as in the other embodiments.

In one successfully operated circuit in accordance with Fig. 1, the following parameters were found to be entirely satisfactory:

| | |
|---|---|
| Capacitor 12 | .001 microfarad |
| Capacitor 15 | 5 microfarads |
| Capacitor 22 | 0.1 microfarad |
| Capacitor 20 | 0.1 microfarad |
| Capacitance 40 | .0001 microfarad |
| Capacitance 44 | 10 microfarads |
| Capacitor 39 | 0.5 microfarad |
| Tube 11 | 6BG6 |
| Tube 28 | 1B3 |
| Tube 24 | 6W4 |
| Resistor 13 | 1 megohm |
| Resistor 25 | 7000 ohms |
| Inductor 38 | Of order of 1 millihenry |
| Inductor 34 | Of order of 40 millihenries |
| Inductor 21 | Of order of 1 millihenry |
| Winding 28 | 200 millihenries |
| Winding 27 | 200 millihenries |
| Winding 23 | 80 millinhenries |
| Voltage +B | 350 volts |
| Yoke 33 | 8.3 millihenries |

In the Figs. 2, 3, and 4 embodiments the power amplifier tube 11, the rectifier tube 28, and other prior-art circuit elements constituting the general environment in which my novel circuit is of utility are omitted for purposes of simplicity in representation.

While there have been shown and described

Among the advantages of this anti-ring circuit is the fact that the adjustments of the width control inductor 34 and the inductor 38 are independent, so that inductor 38 may be adjusted to suppress the ring frequency independent of the setting of the width control.

what are at present considered to be the preferred embodiments of the present invention, it will be obvious to those skilled in the art that various modifications and substitutions of equivalents may be made therein without departing from the true scope of the invention as defined by the appended claims.

I claim:

1. In a television receiver of the type including a source of deflecting signals, a cathode ray tube having deflection windings, and an output transformer including a primary and a secondary for coupling said source to said windings, a circuit for coupling said secondary to said windings while suppressing undesired transient oscillations, comprising an inductance connected in series with said secondary and said deflection windings on the low potential side of both thereof, and means for tuning the effectively parallel circuit formed by said inductance and the distributed capacitance between said windings and ground to anti-resonance for frequencies of the order of said undesired transient oscillations, said means comprising a trimmer capacitor connected between ground and the low-potential terminal of said windings.

2. In a television receiver of the type including a source of deflecting signals, a cathode ray tube having deflection windings, and an output transformer including a primary and a secondary for coupling said source to said windings, a circuit for coupling said secondary to said windings while suppressing undesired transient oscillations, comprising a variable inductance connected in series with said secondary and said deflection windings on the low potential side of both thereof, and means comprising a trimmer capacitor effectively in shunt with said inductor for tuning the effectively parallel circuit formed by said inductance and the distributed capacitance between said windings and ground to anti-resonance for frequencies of the order of said undesired transient oscillations.

3. In a television receiver of the type including a source of deflecting signals, a cathode ray tube having deflecting windings, and an output transformer including a primary and a secondary for coupling said source to said windings, a circuit for coupling said secondary to said deflecting windings while suppressing undesired transient oscillations comprising a lumped capacitance for A. C. grounding the low potential terminal of said secondary, a tuned inductance having a value small with respect to the inductance of said deflecting windings connected in series with said secondary and said deflecting windings on the low potential side of both thereof, said inductance forming with the distributed capacitance between said windings and ground a tuned circuit, and means comprising an adjustable magnetic core for tuning said tuned circuit to frequencies on the order of said undesired transient oscillations.

4. In a television receiver of the type including a source of deflecting signals, a cathode ray tube having deflecting windings, and an output transformer including a primary and a secondary for coupling said source to said windings, a circuit for coupling said secondary to said deflecting windings while suppressing undesired transient oscillations comprising means for grounding the low potential terminal of said secondary, a tuned inductance having a value small with respect to the inductance of said deflecting windings connected in series with said secondary and said deflecting windings on the low potential side of both thereof, said inductance forming with the distributed capacitance between said windings and ground a tuned circuit, and means comprising an adjustable magnetic core for tuning said tuned circuit to frequencies on the order of said undesired transient oscillations.

HANS G. SCHWARZ.

REFERENCES CITED

The following references are of record in the file of this patent:

UNITED STATES PATENTS

| Number | Name | Date |
|---|---|---|
| 2,438,359 | Clapp | Mar. 23, 1948 |
| 2,440,418 | Tourshou | Apr. 27, 1948 |
| 2,443,030 | Foster | June 8, 1948 |
| 2,449,969 | Wright | Sept. 28, 1948 |
| 2,474,474 | Friend | June 28, 1949 |
| 2,492,090 | Bass | Dec. 20, 1949 |
| 2,498,007 | Schade | Feb. 21, 1950 |